United States Patent
Zaborszki et al.

(10) Patent No.: US 10,591,092 B2
(45) Date of Patent: Mar. 17, 2020

(54) HYBRID HOSE ASSEMBLY

(71) Applicant: Swagelok Company, Solon, OH (US)

(72) Inventors: Stephen J. Zaborszki, Northfield Center, OH (US); Corey Pasheilich, Solon, OH (US)

(73) Assignee: SWAGELOK COMPANY, Solon, OH (US)

( * ) Notice: Subject to any disclaimer, the term of this patent is extended or adjusted under 35 U.S.C. 154(b) by 46 days.

(21) Appl. No.: 15/896,266

(22) Filed: Feb. 14, 2018

(65) Prior Publication Data

US 2018/0259097 A1 Sep. 13, 2018

Related U.S. Application Data

(60) Provisional application No. 62/467,978, filed on Mar. 7, 2017.

(51) Int. Cl.
| | |
|---|---|
| *F16L 11/08* | (2006.01) |
| *B32B 1/08* | (2006.01) |
| *B32B 5/24* | (2006.01) |
| *B32B 25/10* | (2006.01) |
| *B29D 23/00* | (2006.01) |
| *B32B 25/08* | (2006.01) |

(Continued)

(52) U.S. Cl.
CPC .......... *F16L 11/085* (2013.01); *B29D 23/001* (2013.01); *B32B 1/08* (2013.01); *B32B 5/24* (2013.01); *B32B 25/08* (2013.01); *B32B 25/10* (2013.01); *F16L 11/081* (2013.01); *F16L 33/01* (2013.01); *F16L 33/26* (2013.01)

(58) Field of Classification Search
CPC .......... B29D 23/001; B32B 1/08; B32B 5/24; B32B 25/08; B32B 25/10; F16L 11/085; F16L 11/081; F16L 33/01; F16L 33/26
USPC .................................................. 138/114, 109
See application file for complete search history.

(56) References Cited

U.S. PATENT DOCUMENTS

| | | | |
|---|---|---|---|
| 3,934,618 A | * | 1/1976 | Henderson ................ F16L 9/18 138/114 |
| 4,089,351 A | | 5/1978 | Ward et al. |

(Continued)

FOREIGN PATENT DOCUMENTS

| | | |
|---|---|---|
| CN | 205859397 | 1/2017 |
| DE | 4240816 | 6/1994 |

(Continued)

OTHER PUBLICATIONS

International Search Report and Written Opinion from PCT/US2018/018107 dated Apr. 30, 2018.

(Continued)

*Primary Examiner* — Craig M Schneider
*Assistant Examiner* — David R Deal
(74) *Attorney, Agent, or Firm* — Calfee, Halter & Griswold LLP

(57) ABSTRACT

A hose assembly includes an inner core tube, a connector secured to a distal end of the inner core tube, an outer metal tube substantially coaxial with and surrounding the inner core tube, and a collar substantially coaxial with and surrounding the distal end of the inner core tube. The outer metal tube terminates at a distal end axially inward of the distal end of the inner core tube. The collar includes a first end welded to the distal end of the outer metal tube and a second end welded to the connector.

18 Claims, 4 Drawing Sheets

(51) Int. Cl.
*F16L 33/26* (2006.01)
*F16L 33/01* (2006.01)

(56) References Cited

U.S. PATENT DOCUMENTS

| | | | |
|---|---|---|---|
| 5,031,301 A | 7/1991 | Oetiker | |
| 5,285,744 A | 2/1994 | Grantham et al. | |
| 5,782,579 A * | 7/1998 | Dupouy | B67D 7/3209 |
| | | | 138/114 |
| 5,829,483 A * | 11/1998 | Tukahara | F16L 9/18 |
| | | | 138/109 |
| 6,279,614 B1 * | 8/2001 | Riesselmann | B32B 1/08 |
| | | | 138/137 |
| 6,546,951 B1 * | 4/2003 | Armenia | A47L 15/421 |
| | | | 137/312 |
| 7,178,521 B2 * | 2/2007 | Burrow | A61M 16/0816 |
| | | | 128/202.27 |
| 7,338,090 B2 | 5/2008 | Baldwin et al. | |
| 7,543,368 B2 | 6/2009 | Ingram | |
| 8,230,885 B2 | 7/2012 | Krauss et al. | |
| 8,439,405 B2 | 5/2013 | Trujillo et al. | |
| 8,888,139 B2 | 11/2014 | Hunter | |
| 8,997,794 B2 * | 4/2015 | Kwon | F16L 11/15 |
| | | | 138/109 |
| 9,273,810 B1 | 3/2016 | Martin | |
| 2002/0017330 A1 * | 2/2002 | Armenia | E03C 1/021 |
| | | | 138/109 |
| 2005/0229990 A1 * | 10/2005 | Hilgert | F16L 25/0036 |
| | | | 138/121 |
| 2008/0191472 A1 * | 8/2008 | Vieregge | F16L 19/028 |
| | | | 285/256 |
| 2010/0229992 A1 * | 9/2010 | Witz | B29D 23/18 |
| | | | 138/109 |
| 2012/0060959 A1 * | 3/2012 | Dianetti | F16L 33/207 |
| | | | 138/109 |
| 2013/0291988 A1 * | 11/2013 | Hegler | F16L 13/02 |
| | | | 138/109 |
| 2016/0025246 A1 | 1/2016 | Nelson et al. | |
| 2016/0146379 A1 | 5/2016 | LaTulippe et al. | |

FOREIGN PATENT DOCUMENTS

| | | |
|---|---|---|
| DE | 102010008733 | 8/2011 |
| EP | 104835 | 4/1984 |
| EP | 629805 | 8/1997 |
| EP | 1650483 | 4/2006 |
| EP | 1368589 | 4/2010 |
| FR | 850967 | 12/1939 |
| FR | 1271016 | 9/1961 |
| FR | 1403408 | 5/1965 |
| GB | 746973 | 3/1956 |
| GB | 839262 | 6/1960 |

OTHER PUBLICATIONS

BOA Group, Hose and Bellows Technology for Highest Purity Requirements brochure, 5 pgs., at least as early as the filing date of the subject application.

BOA Group, Hybrid Hose Series, one page brochure, at least as early as the filing date of the subject application.

Swagelok Company, Technical Drawing, Hybrid Hose, one page, Sep. 29, 2015.

Swagelok, BOA Group, Boa NL-Hybrid Hose, dated Oct. 20, 2015, 20 pgs.

Swagelok Company, Hose and Flexible Tubing, 92 p. brochure, dated at least as early as the filing date of the subject application.

* cited by examiner

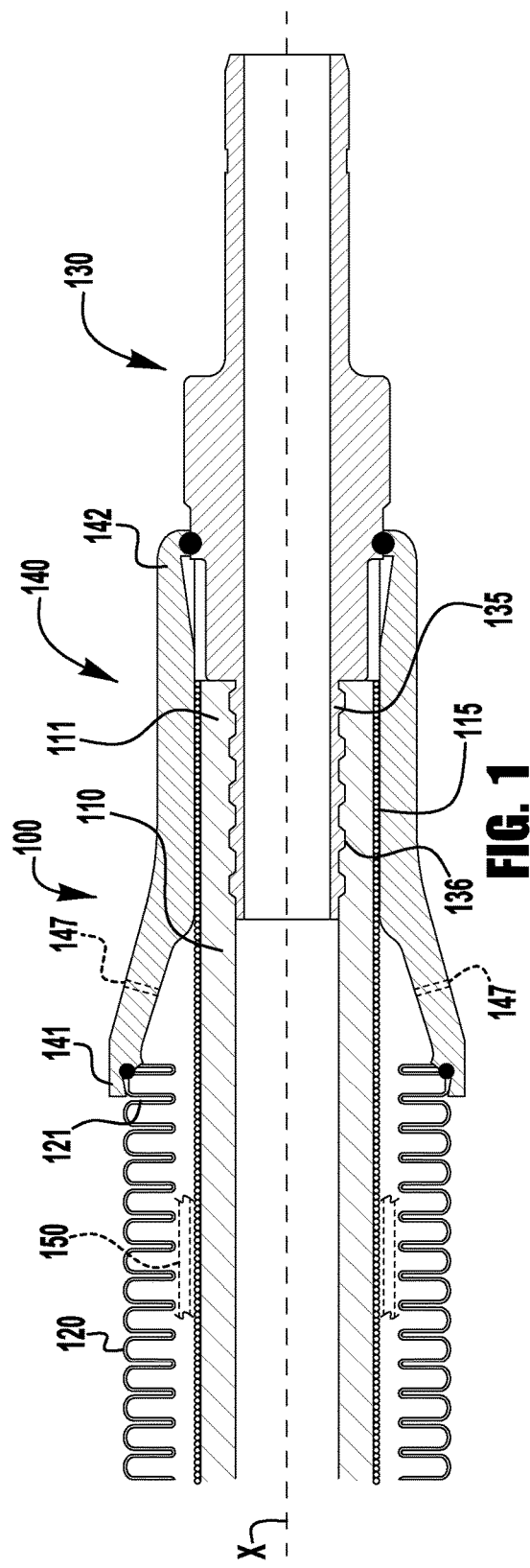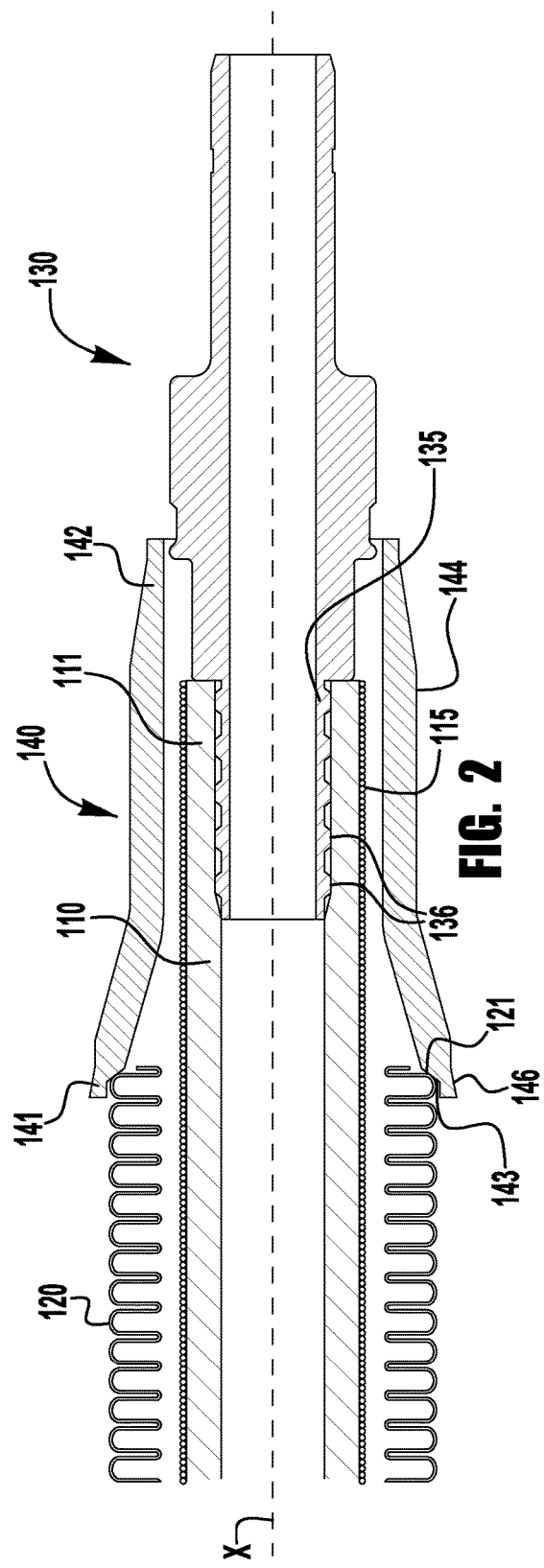

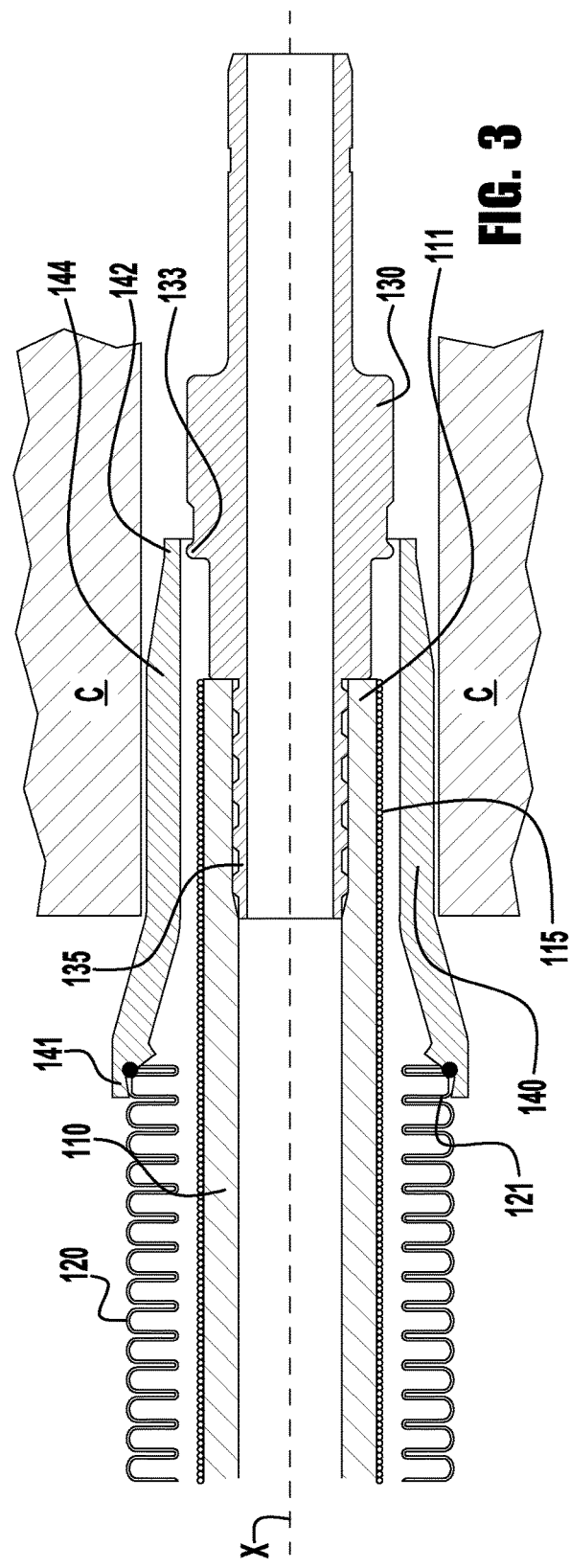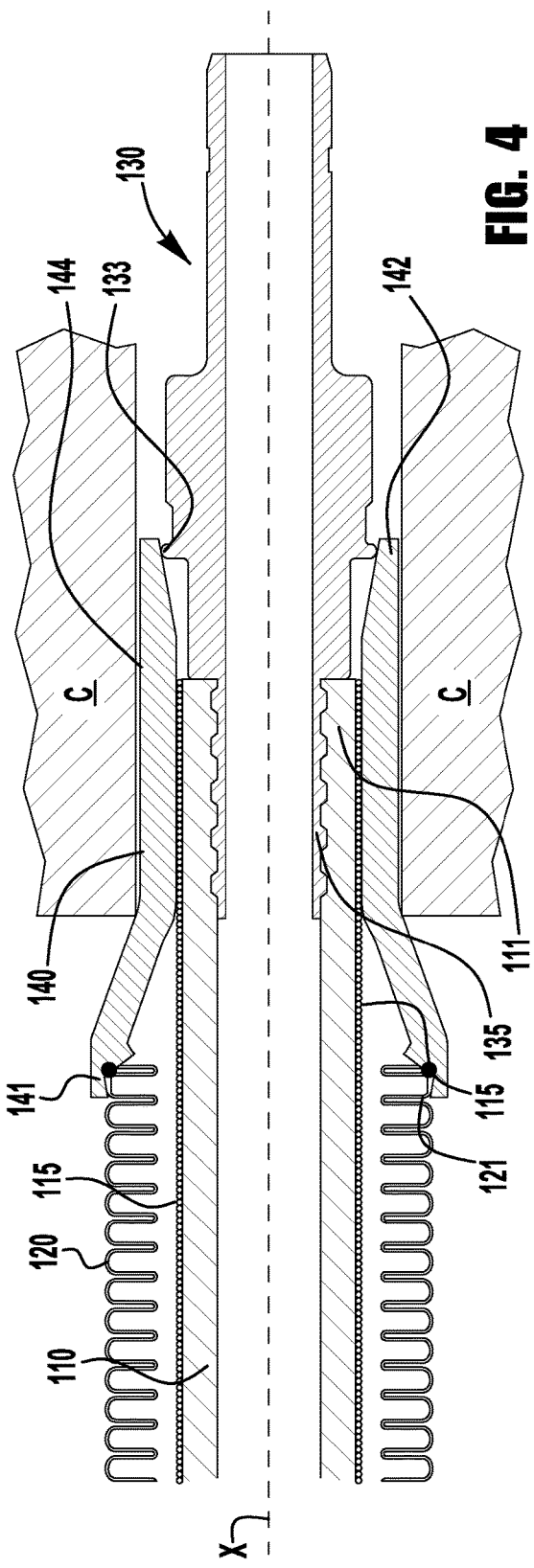

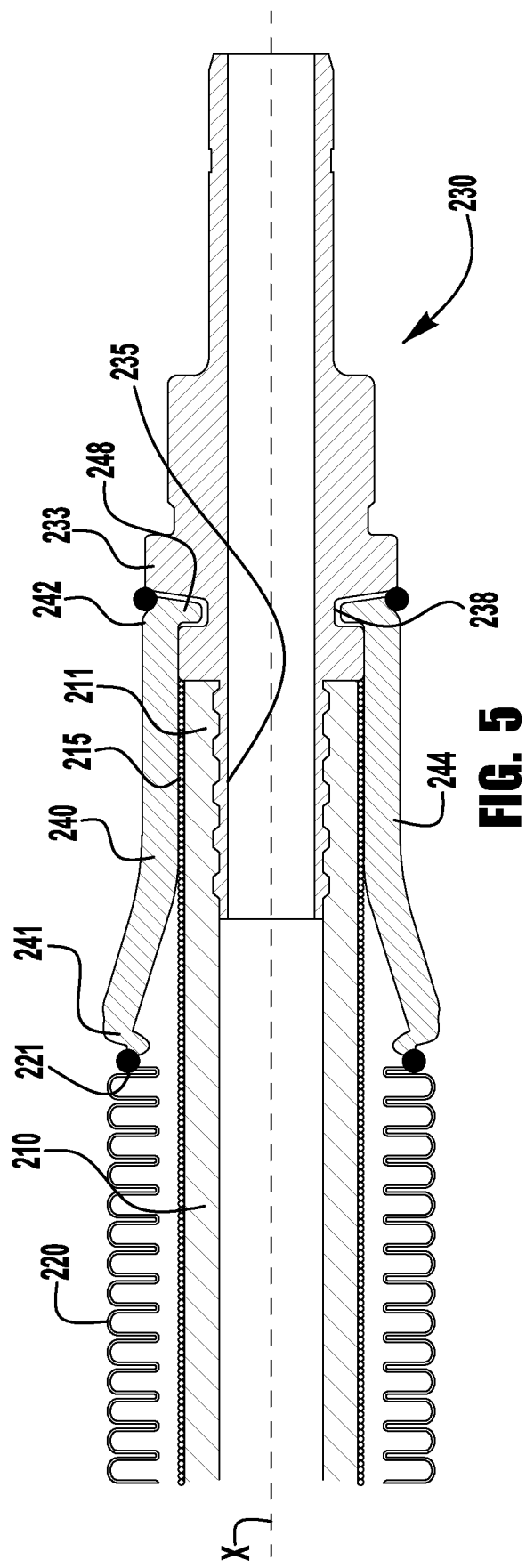

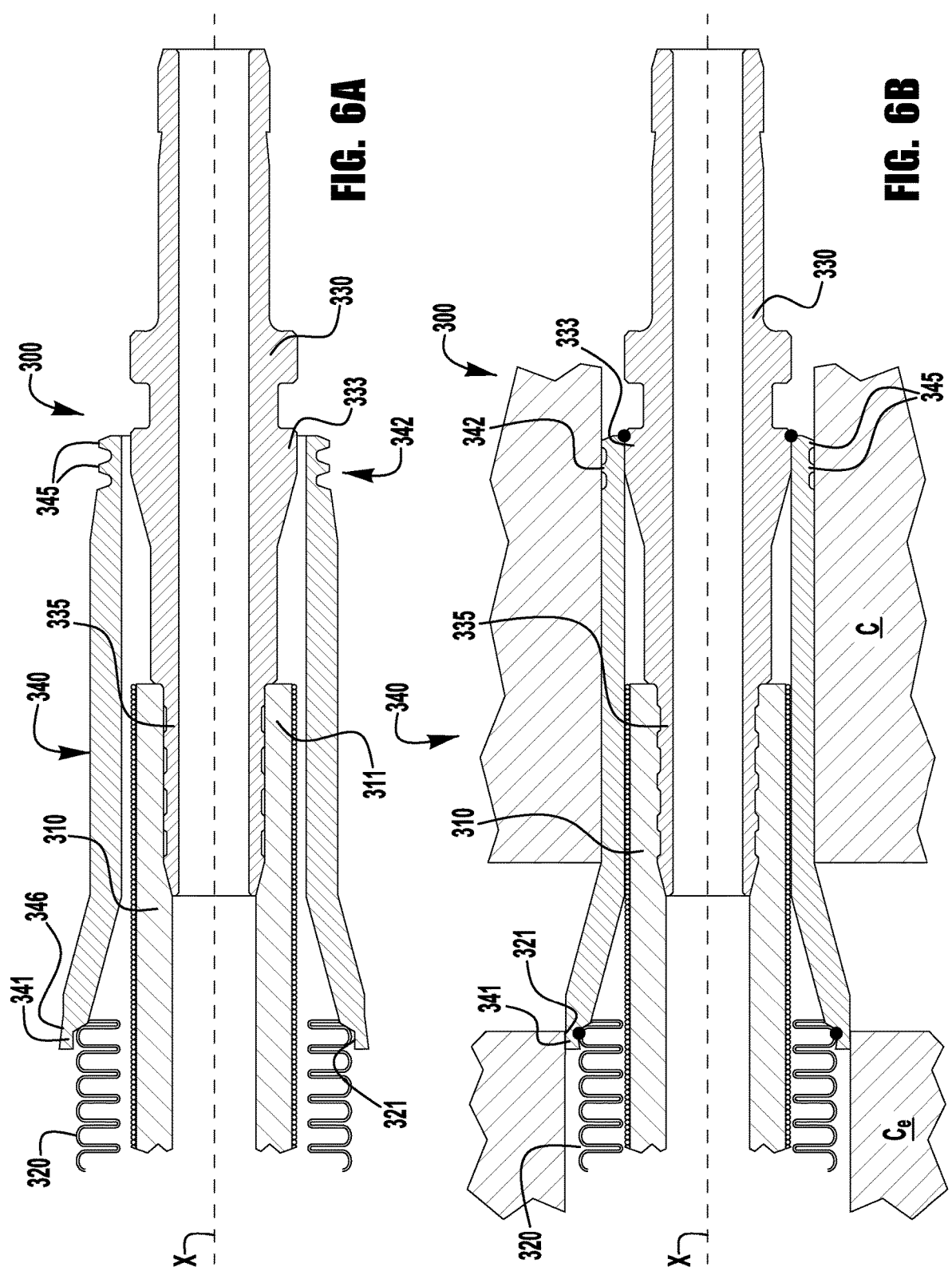

HYBRID HOSE ASSEMBLY

CROSS-REFERENCE TO RELATED APPLICATION

This application claims priority to and all benefit of U.S. Provisional Patent Application Ser. No. 62/467,978, filed on Mar. 7, 2017, for HYBRID HOSE ASSEMBLY, the entire disclosure of which is fully incorporated herein by reference.

TECHNICAL FIELD OF THE INVENTIONS

The present disclosure relates to flexible hose assemblies for fluid containment and transfer under a variety of pressures and temperatures between two points, and to methods of making such hose assemblies. More particularly, the disclosure relates to multi-layer or "hybrid" flexible hose assemblies having a first layer providing a first property (e.g., cleanability) and a second layer providing a second property (e.g., gas impermeability).

SUMMARY OF THE DISCLOSURE

In accordance with an embodiment of one or more of the inventions presented in this disclosure, a hose assembly includes an inner core tube, a connector secured to a distal end of the inner core tube, an outer metal tube substantially coaxial with and surrounding the inner core tube, and a collar substantially coaxial with and surrounding the distal end of the inner core tube. The outer metal tube terminates at a distal end axially inward of the distal end of the inner core tube. The collar includes a first end welded to the distal end of the outer metal tube and a second end welded to the connector.

In accordance with another embodiment of one or more of the inventions presented in this disclosure, a method of making a hose assembly is contemplated. In the exemplary method, a metal tube is provided having a distal end welded to a first end of a collar, and a core tube is provided having a distal end secured to a connector. The core tube is inserted into the metal tube, and the core tube and the connector are positioned such that a second end of the collar aligns with the connector and the distal end of the core tube extends axially outward of the distal end of the metal tube and aligns with an intermediate portion of the collar. The second end of the collar is welded to the connector.

BRIEF DESCRIPTION OF THE DRAWINGS

FIG. 1 is a partial cross-sectional view of an end portion of a hose assembly, in accordance with an exemplary embodiment of the present application;

FIG. 2 is a partial cross-sectional view of the hose assembly of FIG. 1, shown in a loosely assembled condition;

FIG. 3 is a partial cross-sectional view of the hose assembly of FIG. 1, shown with the inner core tube and end connector subassembly loosely assembled with the outer metal tube and collar subassembly;

FIG. 4 is a partial cross-sectional view of the hose assembly of FIG. 1, shown with the collar crimped inner core tube and end connector;

FIG. 5 is a partial cross-sectional view another hose assembly, in accordance with another exemplary embodiment of the present application;

FIG. 6A is a partial cross-sectional view of another hose assembly, in accordance with another exemplary embodiment of the present application, shown in a loosely assembled condition; and FIG. 6B is a is a partial cross-sectional view of the hose assembly of FIG. 6A, shown in a crimped and welded condition.

DESCRIPTION OF THE EXEMPLARY EMBODIMENTS

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Many applications have requirements for flexible hose to provide a fluid connection between two points in a fluid system, with the flexibility of the hose allowing for various fluid line routing requirements, thermal expansion, misalignment, and intermittent or continuous flexing (e.g., due to system vibrations). In addition to flexibility, different hose properties may be a consideration for use in a particular fluid system, including, for example, system temperature, system pressure, chemical compatibility, resistance to contamination, and gas permeability. In some applications, a first hose material that provides a first property (e.g., resistance to contamination) suitable for the application may have a second property (e.g., gas permeability) that is inadequate for the application. According to an exemplary aspect of the present application, a multi-layer or "hybrid" flexible hose may be provided with an inner core tube providing a desired first property, and a outer tube providing a desired second property. While the inner and outer tubes may be laminated or otherwise attached to each other, in some embodiments, the inner and outer tubes may be separate from each other, and even radially spaced apart from each other, for example, to facilitate assembly or function of the hose. To facilitate installation into a fluid system, hose assemblies are commonly provided with any of a variety of end connectors, including, for example, tube fittings, tube ends (e.g., for welding or installation in a tube fitting), or quick disconnect couplings, and therefore require a leak-tight connection between the inner and outer flexible hose tube components and the end connection. Accordingly, in one aspect of the present application, an arrangement is provided to join separate inner and outer tube components to an end connector.

With reference to FIG. 1, a partial cross-sectional view of an exemplary multi-tube hose 100 is presented. Note that in many of the drawings herein, the fittings are illustrated in longitudinal or half longitudinal cross-section, it being understood by those skilled in the art that the fitting components are in practice annular parts about a longitudinal centerline axis X. All references herein to "radial" and "axial" are referenced to the X axis except as otherwise noted. Also, all references herein to angles are referenced to the X axis except as may be otherwise noted. Also, while the drawings disclose partial views of a hose assembly an end connector provided with an end connector at one end, it is understood by those skilled in the art that a second end connector (either identical to or different from the illustrated end connector) may be provided (e.g., by welding or by some other connection) at an opposite end of the hose assembly.

In the illustrated embodiment, the hose 100 includes an inner core tube 110, an outer tube 120, an end connector 130 secured to a distal end 111 of the inner core tube 110, and a collar 140 having a first end 141 attached to a distal end 121 of the outer tube 120 and a second end 142 attached to the end connector 130. The inner tube 110 and outer tube 120 may be provided in any combination of suitable materials. In an exemplary embodiment, the inner tube 110 comprises a plastic material, such as polytetrafluoroethylene (PTFE) or perfluoroalkoxy alkane (PFA), which may be selected based on fluid system compatibility, gas impermeability, flexibility, or other factors. While the inner tube may be provided in any suitable form, in one embodiment, the inner tube is provided with a smooth cylindrical internal wall, for example, for ease of cleaning and to minimize particle entrapment. The inner tube 110 may additionally include a reinforcement layer 115, such as, for example, an outer braided material (e.g., metallic or fibrous braid material) secured to the inner tube. In other embodiments (not shown), a reinforcement material (e.g., a braided material) may additionally or alternatively be secured to an interior surface of the inner tube, and/or embedded in the wall thickness of the inner tube. This reinforcement layer may provide many benefits, including, for example, prevention of kinking of the core tube (particularly when subjected to a tighter bending radius), maintaining a smooth inside diameter as desired for fluid flow, and minimized radial and axial expansion. In an exemplary embodiment described herein, minimization of radial expansion may improve grip on the core tube end by the connector stem (as described below), allowing the hose to withstand greater fluid pressures and axial pulling forces on the hose (e.g., due to abuse, system vibration, pulsing, or other factors).

In an exemplary embodiment, the outer tube 120 comprises a metal material, such as stainless steel, Hastelloy C-22, or Monel, which may be selected based on gas impermeability, external corrosion resistance, flexibility, or other factors. While the outer tube may be provided in any suitable form, in the illustrated embodiment, the outer tube 120 is provided with a corrugated wall, for example, for increased flexibility. In other embodiments, the outer tube may be helical or of some other suitable construction. The outer tube 120 may be sized to provide a radial gap between the inner tube 110 and the outer tube 120, for example, to provide clearance and ease of insertion of the inner tube into the outer tube during assembly. While the radial gap may be minimized to minimize the outer diameter of the hose assembly (e.g., for efficient storage and routing), in other embodiments, a larger radial gap may be provided between the tubes to allow for the inclusion of radiant barrier material, insulation material, sensors (e.g., thermocouples, strain gauges), and/or other such materials or components (represented schematically at 150 in FIG. 1).

While many different types of attachment may be made between the end connector 130 and the inner tube 110, in the illustrated embodiment, the end connector 130 includes a stem portion 135 received in the distal end 111 of the inner tube. As shown, the stem portion 135 may include a barbed surface 136 configured to grippingly engage the interior surface of the inner tube distal end 111. In some embodiments, secure attachment of the inner tube 110 to the end connector 130 may be achieved by press fit installation of the end connector stem portion. In other embodiments, the distal end 111 of the inner tube 110 may be compressed against the stem portion 135, for example, by crimping or other such compression of the collar 140 against the distal end 111. In still other embodiments (not shown), the end connector stem portion may be flared or expanded against the inner diameter of the distal end.

FIG. 2 illustrates the inner tube 110, outer tube 120, end connector 130, and collar 140, with the collar in a pre-crimped condition. As shown, the first end 141 of the collar 140 may be flared radially outward to accommodate the larger outer diameter of the outer tube 120. An intermediate portion 144 of the collar 140, disposed between the first and second end portions 141, 142, aligns with the distal end 111 of the inner tube 110 and the inserted connector stem portion 135. As shown in FIG. 3, the intermediate portion 144 is compressed or crimped radially inward (e.g., by crimping tool C) against the outer surface of the inner tube 110 (e.g., against the reinforcement layer 115) to compress the distal end 111 of the inner tube 110 into secure gripping engagement with the barbed stem portion 135.

Where the outer tube is utilized to provide a leak-tight, gas-impermeable shell or sheath around a gas permeable inner tube, gas impermeable connections between the adjoining collar and the outer tube and end connector may be provided. While many different types of attachments may be made between the collar 140 and the outer tube 120 and end connector 130, in one embodiment, weld connections are provided at the first and second ends 141, 142 to provide a leak-tight, gas impermeable connection between the outer tube 120 and the end connector 130. To provide for a welded connection, the outer tube 120, end connector 130, and collar 140 may be provided in suitable materials, such as, for example, stainless steel, Hastelloy C-22, or Monel, which may be selected based on external corrosion resistance, or other factors. As used herein the term "welding" is to be accorded its broadest interpretation and encompasses various types of welding as well as the concepts of brazing and soldering.

Many different types of weld connections may be utilized. In the illustrated embodiment of FIGS. 1-4, the first end 141 of the collar 140 includes a counterbore 143 (FIG. 2) sized to receive an endmost corrugation of the outer tube 120, thereby allowing for a side weld operation at the first end of the collar. Alternatively, in another exemplary embodiment, as shown in FIG. 5, the distal end 221 of the outer tube 220 may be prepared (e.g., using a pipe cutter wheel) such that the edge of the distal end radially aligns with the first end 241 of the collar 240, such that the distal end 221 may be butt welded to the collar first end 241. Additionally or alternatively, as shown in FIGS. 2 and 6A, a collar 140, 340 may include a first end portion 141, 341 having an outwardly tapered surface 146, 346 that is engaged by a crimping tool (e.g., a horizontal profile crimp finger $C_e$, as shown in FIG. 6B) that crimps the tapered end portion 341 into an inverted condition (see FIGS. 1 and 6B), such that the end portion 141, 341 closely captures the endmost corrugation of the outer tube. This may facilitate welding of the collar end portion 141, 341 to the outer tube corrugation.

The second end 142 of the exemplary collar 140 of FIGS. 1-4 axially aligns with an annular radial projection or rib 133 (FIG. 3) on the end connector 130, to allow for welding of the annular rib 133 to the collar second end 142. The welded metal arrangement of the outer tube 120, the collar 140, and the end connector may provide a gas impermeable shell (e.g., having a gas permeability of less than about $1 \times 10^{-5}$ scc/sec or between about $1 \times 10^{-9}$ scc/sec and about $1 \times 10^{-7}$ scc/sec) around a gas permeable inner tube 110 (e.g., having a gas permeability of greater than about $1 \times 10^{-4}$ scc/sec, or between about $1 \times 10^{-3}$ scc/sec and about $1 \times 10^{-2}$ scc/sec).

Welding of the collar second end 142 to the end connector rib 133 may be facilitated by providing a distortion interference fit between the collar second end 142 and the end connector rib 133, for example, during the collar crimping operation. In the illustrated embodiment, the intermediate portion 144 of the collar 140 is provided with a first outer diameter and the second end portion 142 of the collar is provided with a second outer diameter smaller than the first outer diameter. When the linear crimping tool C is initially applied to the intermediate portion 144 of the collar 140 (FIG. 3), a radial gap is disposed between the crimping tool C and the second end portion 142 of the collar 140, such that the crimping force is initially focused on the intermediate portion 144 of the collar 140. As the intermediate portion 144 of the collar 140 is deformed into a crimped condition, and the crimping tool C is brought into contact with the collar second end 142, compression of the collar second end 142 against the end connector rib 133 generates the distortion interference fit condition (FIG. 4). In other embodiments, the collar second end portion may be crimped against the end connector (e.g., against an annular rib or other such feature) in a separate crimping operation. In other embodiments, as shown in FIG. 5, the second end 242 of the collar 240 may include an inward extending flange 248 that is received in (e.g., crimped into) an annular groove 238 adjacent an annular projection or rib 233, to allow for butt welding the collar second end 242 to the rib 233. In still other embodiments, as shown in FIG. 6B, the second end portion 342 of the collar 340 may be welded against a more elongated cylindrical surface 333 of the end connection, for a more robust weld connection (e.g., to inhibit weld blow through).

According to another exemplary aspect of the present application, an end portion of a weld collar to be crimped onto a tube and end connector may be provided with one or more raised material features (e.g., ribs, threads, protuberances, or other such raised portions) on an outer surface of the end portion to be crimped. The raised material features may be sized and positioned to absorb the compressive load from the crimping tool, sufficient to crimp the collar into radial contact with the end connector, with additional compressive load applied to the crimped collar end portion radially deforming or flattening the raised material features, such that this additional compressive load does not collapse the inside diameter of the end connector. In an exemplary embodiment, as shown in FIGS. 6A and 6B, the second end portion 342 of the collar 340 includes a series of annular ribs 345 that are flattened or radially deformed when subjected to additional compressive load applied to the crimped collar end portion 342 deforming or flattening ribs 345, such that this additional compressive load does not collapse the inside diameter of the end connector 330. The endmost rib 345 may be positioned at the edge of the second end portion 342, and may be aligned with a corresponding shoulder portion 334 (defining a terminal edge of the cylindrical surface 333), providing an easily identified target weld location.

In an exemplary method of making a hose assembly, a stem portion 135, 235, 335 of an end connector 130, 230, 330 is inserted into a distal end 111, 211, 311 of an inner tube 110, 210, 310 and a first end 141, 241, 341 of a collar 140, 240, 340 is welded to a distal end 121, 221, 321 of an outer tube 120. The inner tube 110, 210, 310 is inserted into the outer tube 120, 220, 320 and is axially positioned such that a second end of the collar aligns with the end connector 130, 230, 330 and the distal end 111, 211, 311 of the inner tube 110, 210, 310 extends axially outward of the distal end of the outer tube to align with an intermediate portion 144, 244, 344 of the collar 140, 240, 340. The intermediate portion 144, 244, 344 of the collar is crimped against the distal end 111, 211, 311 of the inner tube 110, 210, 310 to secure the inner tube to the stem portion 135, 235, 335 of the end connector 130, 230, 330, and the second end portion 142, 242, 342 of the collar 140, 240, 340 is crimped against the end connector. The crimped second end portion 142, 242, 342 of the collar is welded to the mating portion of the connector 130, 230, 330.

According to another exemplary aspect of the present application, the collar 140 may be provided with one or more test ports 147 (FIG. 1) to check for leakage (e.g., beyond ordinary gas permeability) through the inner tube 110. The test port 147 may be provided as a weep hole that may be welded over or otherwise blocked after testing. Other leak testing methods may additionally or alternatively be applied. As one example, a sample cylinder having a known pressure and volume may be assembled with the hose. The equilibrium pressure of the cylinder and hose assembly may then be measured to determine if there is leakage through the inner tube. In another example, a measurement or inspection of the outer metal tube may identify flexing of the tube corrugations in response to a leak through the inner tube.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A hose assembly comprising:
   an inner core tube;
   a connector comprising a stem portion inserted into a distal end of the inner core tube;
   an outer metal tube substantially coaxial with and surrounding the inner core tube, the outer metal tube terminating at a distal end axially inward of the distal end of the inner core tube; and
   a collar substantially coaxial with and surrounding the distal end of the inner core tube, the collar including a flared first end welded to the distal end of the outer metal tube a second end welded to the connector, and an intermediate portion between the first end and the second end, wherein the intermediate portion is in radial compression against the distal end of the inner core tube to secure the distal end of the inner core tube to the connector stem portion.

2. The hose assembly of claim 1, wherein the outer metal tube comprises a corrugated tube.

3. The hose assembly of claim 2, wherein the first end of the collar comprises a counterbore sized to receive an endmost corrugation of the corrugated tube.

4. The hose assembly of claim 2, wherein the first end of the collar is crimped over an endmost corrugation of the corrugated tube.

5. The hose assembly claim 1, wherein the inner core tube comprises plastic.

6. The hose assembly of claim 1, wherein the inner core tube comprises a reinforcement layer secured to a tubular core element.

7. The hose assembly of claim 6, wherein the reinforcement layer is secured to an outer surface of the core element.

8. The hose assembly of claim 1, wherein the outer metal tube and the inner core tube are separated by a radial gap.

9. The hose assembly of claim 1, wherein the intermediate portion of the collar is crimped against the distal end of the inner core tube.

10. The hose assembly of claim 1, wherein the stem portion comprises an outer barbed portion for retention of the distal end of the inner core tube.

11. The hose assembly of claim 1, wherein the distal end of the outer metal tube is axially spaced apart from the connector.

12. The hose assembly of claim 1, wherein the second end of the collar is welded to an annular rib of the connector.

13. The hose assembly of claim 1, wherein the second end of the collar is welded to a cylindrical shoulder of the connector.

14. The hose assembly of claim 1, wherein the second end of the collar is crimped against an annular rib of the connector.

15. The hose assembly of claim 1, wherein the second end of the collar is crimped against a cylindrical shoulder of the connector.

16. A hose assembly comprising:
   an inner core tube;
   a connector secured to a distal end of the inner core tube;
   an outer metal tube substantially coaxial with and surrounding the inner core tube, the outer metal tube terminating at a distal end axially inward of the distal end of the inner core tube; and
   a collar substantially coaxial with and surrounding the distal end of the inner core tube, the collar including a first end welded to the distal end of the outer metal tube and a second end welded to the connector,
   wherein the second end of the collar comprises one or more raised portions on an outer surface of the second end of the collar, the one or more raised portions being radially deformed.

17. The hose assembly of claim 16, wherein the one or more raised portions comprises a plurality of annular ribs.

18. A method of making a hose assembly, the method comprising:
   providing a metal tube having a distal end welded to a flared first end of a collar;
   providing a core tube having a distal end receiving a stem portion of a connector;
   inserting the core tube into the metal tube;
   positioning the core tube and the connector such that a second end of the collar aligns with the connector and the distal end of the core tube extends axially outward of the distal end of the metal tube and aligns with an intermediate portion of the collar;
   radially compressing the intermediate portion of the collar against the distal end of the inner core tube to secure the distal end of the inner core tube to the connector stem portion; and
   welding the second end of the collar to the connector.

* * * * *